(12) United States Patent
Deng et al.

(10) Patent No.: US 10,530,515 B2
(45) Date of Patent: Jan. 7, 2020

(54) OADM NODE AND METHOD IN WDM SYSTEM

(71) Applicant: Huawei Technologies Co., Ltd., Shenzhen (CN)

(72) Inventors: Ning Deng, Shenzhen (CN); Shiyi Cao, Shenzhen (CN); Jun Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/914,716

(22) Filed: Mar. 7, 2018

(65) Prior Publication Data
US 2018/0198550 A1    Jul. 12, 2018

Related U.S. Application Data

(63) Continuation of application No. PCT/CN2015/089117, filed on Sep. 8, 2015.

(51) Int. Cl.
*H04J 14/02* (2006.01)
*H04B 10/2581* (2013.01)
(Continued)

(52) U.S. Cl.
CPC ...... *H04J 14/0205* (2013.01); *H04B 10/2581* (2013.01); *H04B 10/275* (2013.01);
(Continued)

(58) Field of Classification Search
CPC ............ H04B 10/07953; H04B 10/516; H04B 10/2575; H04J 13/18; H04J 14/005; H04L 5/0048; H04L 27/26; H04W 88/08
(Continued)

(56) References Cited

U.S. PATENT DOCUMENTS 6,449,073 B1 *   9/2002   Huber ............... H04J 14/02
                                                        385/16
6,608,709 B2     8/2003   Duerksen
(Continued)

FOREIGN PATENT DOCUMENTS

CN       1885755 A     12/2006
CN     101227247 A      7/2008
(Continued)

OTHER PUBLICATIONS

Widjaja, "Study of GMPLS Lightpath Setup over Lambda-Router Networks", IEEE publication year 2002.*
(Continued)

*Primary Examiner* — Juan A Torres
(74) *Attorney, Agent, or Firm* — Slater Matsil, LLP

(57) ABSTRACT

A node in a wavelength division multiplexing (WDM) system is provided, which includes: a colorless optical transmitter, a first arrayed waveguide grating, a first waveband filter configured to divide an input optical signal into M sub-signals of different wavebands and output to a first optical switch, and a first optical coupler/a first optical combiner. A transmit end of the colorless optical transmitter is coupled to an input end of the first waveband filter via the first arrayed waveguide grating. The first optical switch is configured to connect an output end of the first waveband filter to an input end of the first optical coupler/the first optical combiner according to a control signal. An output end of the first optical coupler/the first optical combiner is coupled to an optical transmission path.

15 Claims, 11 Drawing Sheets

(51) Int. Cl.
*H04B 10/275* (2013.01)
*H04Q 11/00* (2006.01)

(52) U.S. Cl.
CPC ...... *H04J 14/0212* (2013.01); *H04J 14/0213* (2013.01); *H04Q 11/0005* (2013.01); *H04Q 11/0062* (2013.01); *H04Q 2011/0009* (2013.01)

(58) Field of Classification Search
USPC .................................................... 398/26, 84
See application file for complete search history.

(56) References Cited

U.S. PATENT DOCUMENTS

| | | | |
|---|---|---|---|
| 7,184,666 | B1 | 2/2007 | Li et al. |
| 2004/0208581 | A1 | 10/2004 | Li et al. |
| 2009/0047019 | A1 | 2/2009 | Palacharla et al. |
| 2010/0046949 | A1* | 2/2010 | Bainbridge .......... H04B 10/506 398/79 |
| 2011/0038635 | A1* | 2/2011 | Bai ....................... H01S 5/0656 398/82 |
| 2012/0294618 | A1 | 11/2012 | Yu et al. |
| 2013/0322883 | A1 | 12/2013 | Dahlfort et al. |
| 2014/0029951 | A1 | 1/2014 | Handelman |
| 2016/0269809 | A1 | 9/2016 | Jiang et al. |
| 2016/0301495 | A1* | 10/2016 | Ji ........................ H04J 14/0204 |
| 2016/0308639 | A1 | 10/2016 | Zhang et al. |

FOREIGN PATENT DOCUMENTS

| | | |
|---|---|---|
| CN | 101420286 A | 4/2009 |
| CN | 102790653 A | 11/2012 |
| CN | 103023599 A | 4/2013 |
| CN | 104661117 A | 5/2015 |
| CN | 104904140 A | 9/2015 |
| EP | 2728778 A2 | 5/2014 |

OTHER PUBLICATIONS

"IEEE Standard for a Precision Clock Synchronization Protocol for Networked Measurement arid Control Systems", IEEE Instrumentation and Measurement Society; Sponsored by the Technical Committee on Sensor Technology (TC-9); IEEE Std 1588; Jul. 24, 2008; 289 pages; New York, NY.

"Series G: Transmission Systems and Media, Digital Systems and Networks", Transmission media and optical systems characteristics—Characteristics of optical systems; Multichannel seeded DWDM applications with single-channel optical interfaces; ITU-T; G.698.3; Feb. 2012; 24 pages; International Telecommunication Union.

"Draft new Recommendation ITU-T G.698.4 (ex G.metro)", International Telecommunication Union; Telecommunication Standardization Sector; SG15-TD182R2/PLEN; Jan. 29-Feb. 9, 2018; 26 pages; Editors G.698.4; Geneva.

\* cited by examiner

5(a): a filtering response of a first waveband filter

5(b): a filtering response of a first arrayed waveguide grating at a first fan-out port 5(c): a filtering response jointly formed by the first waveband filter and the first arrayed waveguide grating

OADM NODE AND METHOD IN WDM SYSTEM

CROSS-REFERENCE TO RELATED APPLICATIONS

This application is a continuation of International Application No. PCT/CN2015/089117, filed on Sep. 8, 2015, the disclosure of which is hereby incorporated by reference in its entirety.

TECHNICAL FIELD

The present disclosure relates to the field of optical network technologies, and in particular, to an OADM node and method in a WDM system.

BACKGROUND

Wavelength Division Multiplexing (WDM) refers to an optical transmission technology of simultaneously transmitting a plurality of optical signals of different wavelengths on one optical fiber. As network bandwidth requirements increase, a WDM system has a broad application prospect. A main component of the WDM system includes an optical add/drop multiplexing (OADM) node, and a function of the OADM node may selectively detaching (dropping) one or more wavelength channels from an optical transmission path and inserting (adding) one or more wavelength channels onto the optical transmission path without affecting optical signal transmission on another irrelevant wavelength channel.

Currently, each OADM node in the WDM system is non-reconfigurable, that is, a route of each OADM node is fixed, and only one or more fixed wavelength channels can be added or dropped. In such a WDM system, each OADM node needs to use, according to initial wavelength allocation, a transmitter, an optical add/drop multiplexer, and an optical multiplexer/a demultiplexer (MUX/DEMUX) of a specific corresponding wavelength. Connection relationships of these optical devices used by an OADM node are also related to the wavelength.

However, after such a non-reconfigurable OADM node is deployed, it is difficult to change the wavelength, and the OADM node has poor network resilience and flexibility. In addition, different OADM nodes need to use different transmitters, optical add/drop multiplexers, and optical multiplexers/demultiplexers. This results in difficulty and costs in WDM system design and deployment, hardware installation, management and maintenance, and the like.

SUMMARY

Embodiments of the present invention provide an OADM node and method in a WDM system, so that an add wavelength of the OADM node can be dynamically controlled according to a requirement and the WDM system has a dynamic reconstruction capability, thereby improving flexibility of the WDM system and simplifying deployment, installation, and maintenance of the WDM system.

A first aspect of the embodiments of the present invention provides an OADM node in a WDM system. The OADM node includes an adding unit, where the adding unit includes: a colorless optical transmitter, a first arrayed waveguide grating, a first waveband filter configured to divide an input optical signal into M sub-signals of different wavebands, a first optical switch, and a first optical coupler/a first optical combiner. M is an integer greater than 1, and the M sub-signals of different wavebands are respectively output by M output ends of the first waveband filter. A transmit end of the colorless optical transmitter is coupled to an input end of the first waveband filter using the first arrayed waveguide grating. The M output ends of the first waveband filter are coupled to an input end of the first optical coupler/the first optical combiner using the first optical switch. The first optical switch is configured to connect a target output end to the input end of the first optical coupler/the first optical combiner according to a control signal, where the target output end is one of the M output ends of the first waveband filter. An output end of the first optical coupler/the first optical combiner is coupled to an optical transmission path.

With reference to the first aspect of the embodiments of the present invention, in a first implementation of the first aspect of the embodiments of the present invention, the OADM node further includes a first dropping unit. The first dropping unit includes: a second waveband filter configured to divide an input optical signal into N sub-signals of different wavebands, N second optical switches, a first optical multiplexer, a second optical multiplexer, a second arrayed waveguide grating, and a first colorless optical receiver, where N is an integer greater than 1, and the N sub-signals of different wavebands are respectively output by N output ends of the second waveband filter. An input end of the second waveband filter is coupled to the optical transmission path, and each output end of the second waveband filter is separately coupled to an input end of the first optical multiplexer and an input end of the second optical multiplexer using one second optical switch. The second optical switch is configured to transmit a corresponding sub-signal to the input end of the first optical multiplexer or the input end of the second optical multiplexer according to a control signal. The first optical multiplexer is configured to perform multiplexing processing on the input sub-signal, and an output end of the first optical multiplexer is coupled to a receive end of the first colorless optical receiver using the second arrayed waveguide grating. The second optical multiplexer is configured to perform multiplexing processing on the input sub-signal, and an output end of the second optical multiplexer is coupled to the optical transmission path.

With reference to the first aspect of the embodiments of the present invention, in a second implementation of the first aspect of the embodiments of the present invention, the OADM node further includes a second dropping unit. the second dropping unit includes: a third waveband filter configured to divide an input optical signal into K sub-signals of different wavebands, K third optical switches, a third optical multiplexer, a third arrayed waveguide grating, and a second colorless optical receiver, where K is an integer greater than 1, and the K sub-signals of different wavebands are respectively output by K output ends of the third waveband filter. An input end of the third waveband filter is coupled to the optical transmission path, and each output end of the third waveband filter is coupled to an input end of the third optical multiplexer using one third optical switch. The third optical switch is configured to determine, according to a control signal, whether to transmit a corresponding sub-signal to the input end of the third optical multiplexer; and the third optical multiplexer is configured to perform multiplexing processing on the input sub-signal, and an output end of the third optical multiplexer is coupled to a receive end of the second colorless optical receiver using the third arrayed waveguide grating.

With reference to the first implementation of the first aspect of the embodiments of the present invention, in a third implementation of the first aspect of the embodiments of the present invention, the optical transmission path is a single-fiber bidirectional optical transmission path; and there are two adding units, one adding unit is configured to add an output optical signal onto a first transmission direction of the optical transmission path, and the other adding unit is configured to add the output optical signal onto a second transmission direction of the optical transmission path.

With reference to the third implementation of the first aspect of the embodiments of the present invention, in a fourth implementation of the first aspect of the embodiments of the present invention, there are two first dropping units, one first dropping unit is configured to drop an optical signal from the first transmission direction of the optical transmission path, and the other first dropping unit is configured to drop an optical signal from the second transmission direction of the optical transmission path.

With reference to any one of the first aspect, or the first to the fourth implementations of the first aspect of the embodiments of the present invention, in a fifth implementation of the first aspect of the embodiments of the present invention, the adding unit further includes a second optical coupler and a partial light reflector; the first optical switch is coupled to the input end of the first optical coupler/the first optical combiner using the second optical coupler; and the first optical switch is further coupled to the partial light reflector using the second optical coupler.

With reference to any one of the first aspect, or the first to the fifth implementations of the first aspect of the embodiments of the present invention, in a sixth implementation of the first aspect of the embodiments of the present invention, the control signal includes a plurality of electrical signals that are used to instruct to connect the input end of the first optical coupler/the first optical combiner to one preset target output end, and the plurality of electrical signals are sent by an optical network management plane, an optical network control plane, or an optical network controller in the WDM system.

A second aspect of the embodiments of the present invention provides an OADM node in a WDM system, where the OADM node is applied to a point-to-point WDM system. The OADM node includes: a 1:2 waveband filter configured to divide an input optical signal into two sub-signals of different wavebands, a 2:2 optical switch having two first tributary ports and two second tributary ports, a colorless optical transmitter, a colorless optical receiver, a first arrayed waveguide grating, and a second arrayed waveguide grating, where the two sub-signals of different wavebands are respectively output by two fan-out ports of the 1:2 waveband filter. A common port of the 1:2 waveband filter is coupled to an optical transmission path, and the two fan-out ports of the 1:2 waveband filter are respectively coupled to the two first tributary ports of the 2:2 optical switch. One second tributary port of the 2:2 optical switch is coupled to a transmit end of the colorless optical transmitter using the first arrayed waveguide grating. The other second tributary port of the 2:2 optical switch is coupled to a receive end of the colorless optical receiver using the second arrayed waveguide grating. The 2:2 optical switch is configured to switch between a bar state and a cross state according to a control signal.

With reference to the second aspect of the embodiments of the present invention, in a first implementation of the second aspect of the embodiments of the present invention, the OADM node further includes an optical coupler and a partial light reflector; the common port of the 1:2 waveband filter is coupled to the optical transmission path using the optical coupler; and the common port of the 1:2 waveband filter is further coupled to the partial light reflector using the optical coupler.

With reference to the second aspect or the first implementation of the second aspect of the embodiments of the present invention, in a second implementation of the second aspect of the embodiments of the present invention, the control signal is sent by an optical network management plane, an optical network control plane, or an optical network controller in the WDM system.

A third aspect of the embodiments of the present invention provides an optical add/drop multiplexing method for a WDM system, applied to an OADM node, where the OADM node includes an adding unit. The adding unit includes: a colorless optical transmitter, a first arrayed waveguide grating, a first waveband filter configured to divide an input optical signal into M sub-signals of different wavebands, a first optical switch, and a first optical coupler/a first optical combiner, where M is an integer greater than 1, and the M sub-signals of different wavebands are respectively output by M output ends of the first waveband filter. A transmit end of the colorless optical transmitter is coupled to an input end of the first waveband filter using the first arrayed waveguide grating. The M output ends of the first waveband filter are coupled to an input end of the first optical coupler/the first optical combiner using the first optical switch. An output end of the first optical coupler/the first optical combiner is coupled to an optical transmission path. The method includes receiving a control signal sent by the WDM system, and setting a switching status of the first optical switch according to the control signal, so as to connect a target output end to the input end of the first optical coupler/the first optical combiner, where the target output end is one of the M output ends of the first waveband filter. The method further includes determining a filtering response of the adding unit in a current switching status, and determining a transmission wavelength of the colorless optical transmitter according to the filtering response.

With reference to the third aspect of the embodiments of the present invention, in a first implementation of the third aspect of the embodiments of the present invention, the OADM node further includes a first dropping unit; the first dropping unit includes: a second waveband filter configured to divide an input optical signal into N sub-signals of different wavebands, N second optical switches, a first optical multiplexer, a second optical multiplexer, a second arrayed waveguide grating, and a first colorless optical receiver, where N is an integer greater than 1, and the N sub-signals of different wavebands are respectively output by N output ends of the second waveband filter; an input end of the second waveband filter is coupled to the optical transmission path, and each output end of the second waveband filter is separately coupled to an input end of the first optical multiplexer and an input end of the second optical multiplexer using one second optical switch; an output end of the first optical multiplexer is coupled to a receive end of the first colorless optical receiver using the second arrayed waveguide grating; and an output end of the second optical multiplexer is coupled to the optical transmission path. The method further includes: receiving the control signal sent by the WDM system; setting a switching status of each second optical switch according to the control signal, so as to determine whether to transmit a corresponding sub-signal to the input end of the first optical multiplexer or to the input end of the second optical multiplexer. The method further includes performing multiplexing processing on a sub-signal that is input into the first optical multiplexer, and determining a receiving wavelength of the first colorless optical receiver according to an optical signal on which multiplexing processing is performed by the first optical multiplexer, and performing multiplexing processing on a sub-signal that is input into the second optical multiplexer, and coupling, to the optical transmission path, an optical signal on which multiplexing processing is performed by the second optical multiplexer.

With reference to the third aspect of the embodiments of the present invention, in a second implementation of the third aspect of the embodiments of the present invention, the OADM node further includes a second dropping unit; the second dropping unit includes: a third waveband filter configured to divide an input optical signal into K sub-signals of different wavebands, K third optical switches, a third optical multiplexer, a third arrayed waveguide grating, and a second colorless optical receiver, where K is an integer greater than 1, and the K sub-signals of different wavebands are respectively output by K output ends of the third waveband filter; an input end of the third waveband filter is coupled to the optical transmission path, and each output end of the third waveband filter is coupled to an input end of the third optical multiplexer using one third optical switch; and an output end of the third optical multiplexer is coupled to a receive end of the second colorless optical receiver using the third arrayed waveguide grating. The method further includes: receiving a control signal sent by the WDM system, and setting a switching status of each third optical switch according to the control signal, so as to determine whether to transmit a corresponding sub-signal to the input end of the third optical multiplexer. The method further includes performing multiplexing processing on the sub-signal that is input into the third optical multiplexer, and determining a receiving wavelength of the second colorless optical receiver according to an optical signal on which multiplexing processing is performed.

In the technical solutions provided in the embodiments of the present invention, the first optical switch may connect the input end of the first optical coupler/the first optical combiner to different target output ends of the first waveband filter according to different control signals, and the adding unit may form different filtering responses when the input end of the first optical coupler/the first optical combiner is connected to the different target output ends. Therefore, the adding unit may form different filtering responses by controlling the switching status of the first optical switch. In addition, the filtering response determines a waveband allowed to pass by the adding unit, and the transmission wavelength of the colorless optical transmitter may automatically adapt to the waveband allowed to pass by the adding unit. Therefore, the adding unit may adjust the transmission wavelength of the colorless optical transmitter by controlling the switching status of the first optical switch, so as to dynamically control an add wavelength of the OADM node. Therefore, compared with the prior art, in the embodiments of the present invention, the add wavelength of the OADM node may be dynamically controlled according to a requirement, so that the WDM system has a dynamic reconstruction capability, thereby improving flexibility of the WDM system and simplifying deployment, installation, and maintenance of the WDM system.

DETAILED DESCRIPTION OF ILLUSTRATIVE EMBODIMENTS

Figure 1:
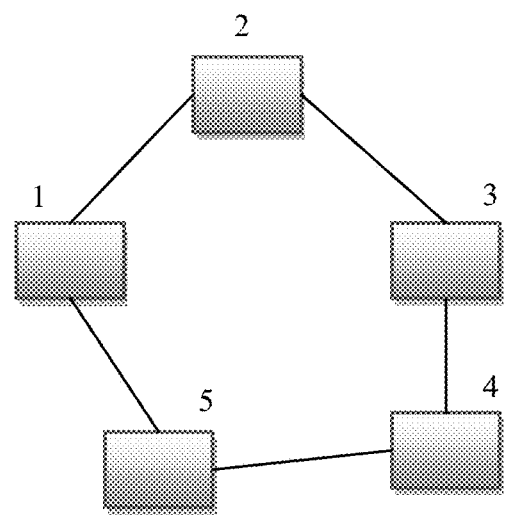
FIG. 1 is a schematic structural diagram of a WDM system according to an embodiment of the present invention.

Embodiments of the present invention provide an OADM node and method in a WDM system, so that an add wavelength of the OADM node can be dynamically controlled according to a requirement and the WDM system has a dynamic reconstruction capability, thereby improving flexibility of the WDM system and simplifying deployment, installation, and maintenance of the WDM system. The following separately provides detailed descriptions.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of embodiments of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "comprise", "have", and any other variants thereof are intended to cover non-exclusive inclusion, for example, a process, method, system, product, or device that includes a series of steps or units is not necessarily limited to those expressly listed steps or units, but may include other steps or units not expressly listed or inherent to such a process, method, system, product, or device.

The embodiments of the present invention may be applied to WDM systems in various networking modes that include point-to-point networking, chain networking, ring networking, and the like. For example, in FIG. 1, a WDM system includes an OADM node 1, an OADM node 2, an OADM node 3, an OADM node 4, and an OADM node 5, and the five nodes form a network in a ring networking mode.

Figure 2:
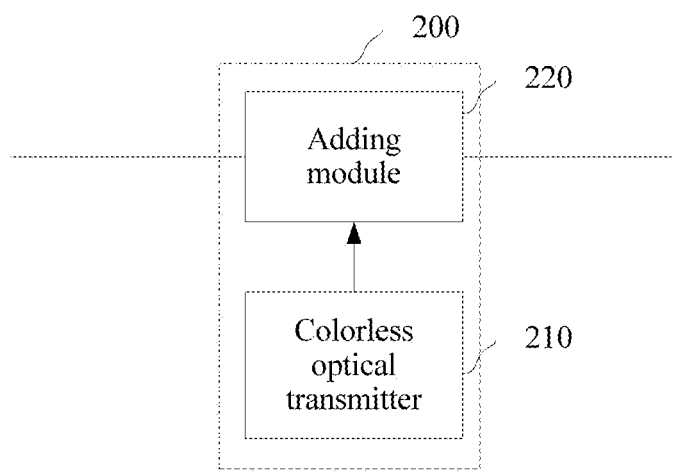
FIG. 2 is a schematic diagram of an embodiment of an OADM node in a WDM system according to an embodiment of the present invention.
Figure 3:
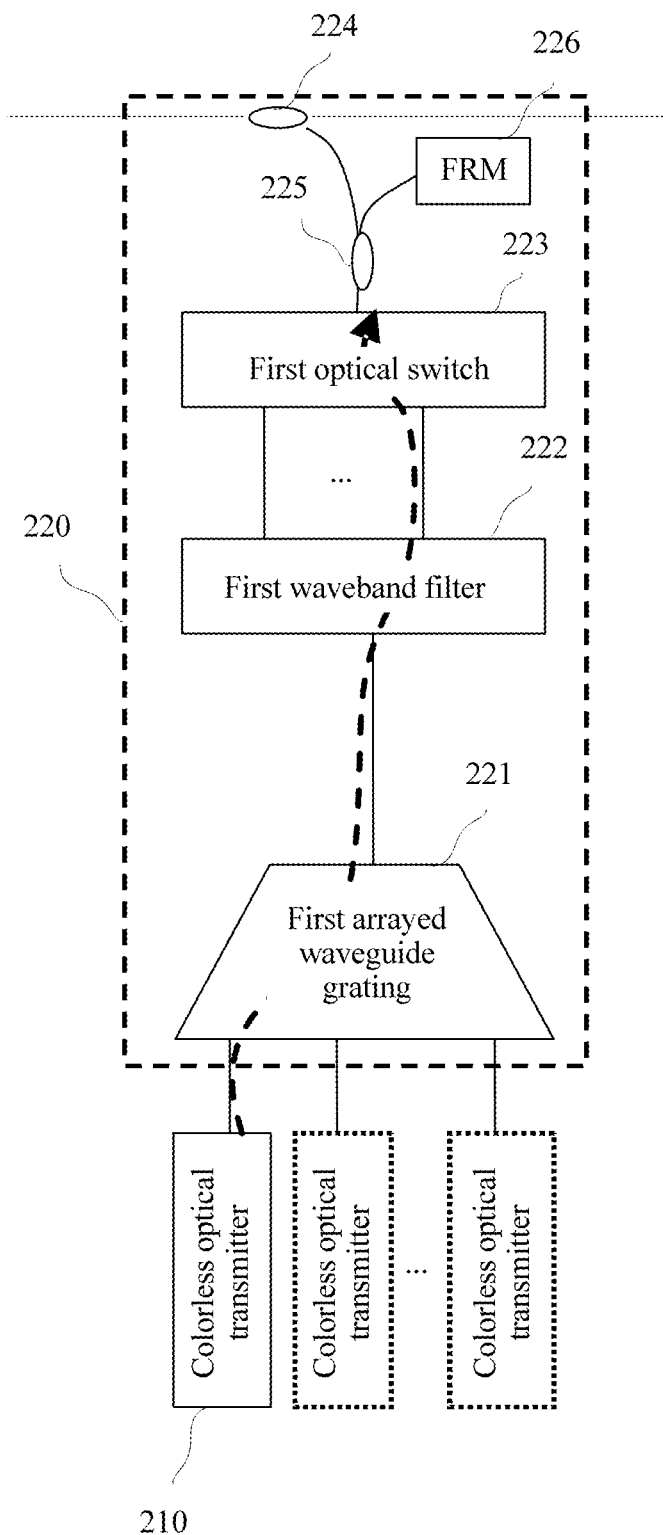
FIG. 3 is a schematic diagram of another embodiment of an OADM node in a WDM system according to an embodiment of the present invention.

Referring to FIG. 2 and FIG. 3, an embodiment of an OADM node in a WDM system according to an embodiment of the present invention includes an adding unit 200. The adding unit 200 includes a colorless optical transmitter 210 and an adding module 220.

A transmission wavelength of the colorless optical transmitter 210 may automatically adapt to a waveband allowed to pass by the adding module 220 connected to the colorless optical transmitter 210. That is, after the waveband allowed to pass by the adding module 220 is determined, the colorless optical transmitter 210 may adaptively adjust the transmission wavelength to the corresponding allowed waveband, to adapt to an optical wavelength response characteristic of the adding module 220. In this embodiment, the colorless optical transmitter 210 may be an optical transmitter including a tunable laser, a Fabry-Perot (FP) laser, a reflective semiconductor optical amplifier (RSOA), a reflective electro-absorption modulator (REAM), or a REAM integrated with a semiconductor optical amplifier (REAM-SOA). It may be understood that, in some other embodiments, the colorless optical transmitter 210 may be another form of colorless optical transmitter. A specific structure form of the colorless optical transmitter is not limited herein.

The adding module 220 includes: a first arrayed waveguide grating 221, a first waveband filter 222 configured to divide an input optical signal into M sub-signals of different wavebands, a first optical switch 223, and a first optical coupler 224, where M is an integer greater than 1, and the M sub-signals of different wavebands are respectively output by M output ends of the first waveband filter 222.

The first arrayed waveguide grating 221 may be a 1:X periodic arrayed waveguide grating, and the 1:X periodic arrayed waveguide grating has one common port and X fan-out ports, where X is an integer greater than 1. In this embodiment, a fan-out port of the first arrayed waveguide grating 221 is coupled to a transmit end of the colorless optical transmitter 210. A common port of the first arrayed waveguide grating 221 is coupled to an input end of the first waveband filter 222.

Figure 4:
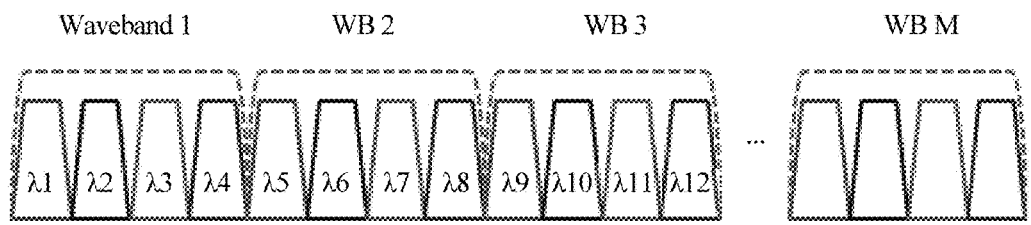
FIG. 4 is a schematic diagram of waveband division for an optical signal.

The first waveband filter 222 is a 1:M waveband filter, and the M output ends of the first waveband filter 222 are coupled to an input end of the first optical coupler 224 using the first optical switch 223. In this embodiment, the M sub-signals of different wavebands are respectively output by the M output ends of the first waveband filter 222. A sub-signal of each waveband is corresponding to one output end of the first waveband filter 222. For example, in FIG. 4, a sub-signal of a waveband (WB) 1 is output by a first output end of the first waveband filter 222, a sub-signal of a WB 2 is output by a second output end of the first waveband filter 222, and a sub-signal of a WB M is output by an $M^{th}$ output end of the first waveband filter 222.

The first optical switch 223 is configured to connect a target output end to the input end of the first optical coupler 224 according to a control signal, and the target output end is one of the M output ends of the first waveband filter 222. That is, a specific output end of the first waveband filter 222 that is connected to the input end of the first optical coupler 224 may be determined by controlling a switching status of the first optical switch 223, so that a sub-signal that is output by the target output end is transmitted to the input end of the first optical coupler. In this embodiment, the first optical switch 223 may be an M:1 optical switch, M input ends of the M:1 optical switch are respectively coupled to the M output ends of the first waveband filter 222, and an output end of the M:1 optical switch is coupled to the input end of the first optical coupler 224.

An output end of the first optical coupler 224 is coupled to an optical transmission path, and configured to couple an input sub-signal to the optical transmission path. In this embodiment, the first optical coupler 224 may be replaced by a first optical combiner.

Figure 5:
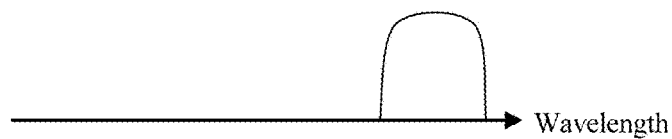
FIG. 5 is a schematic diagram of a filtering response of an adding module in FIG. 2.
Figure 5:
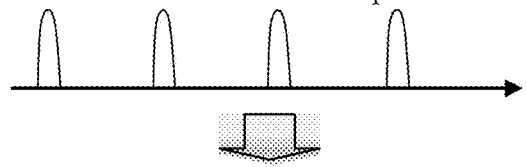
Figure 5:

In this embodiment, the filtering response formed by the adding module 220 is jointly determined by the first arrayed waveguide grating 221 and the first waveband filter 222. For example, in FIG. 3, the colorless optical transmitter 210 is coupled to a first fan-out port of the first arrayed waveguide grating 221, and the $M^{th}$ output end of the first waveband filter 222 is connected to the input end of the first optical coupler 224. An optical transmission path in this case may be shown using a dashed-line part in FIG. 3. Correspondingly, FIG. 5 shows schematic diagrams of filtering responses of the adding module 220 in a current switching status. FIG. 5(a) shows a filtering response of the first waveband filter 222 when the $M^{th}$ output end is connected to the input end of the first optical coupler 224. FIG. 5(b) is a filtering response of the first arrayed waveguide grating 221 at the first fan-out port. FIG. 5c shows a filtering response jointly formed by the first waveband filter 222 and the first arrayed waveguide grating 221 when the adding module 220 is in the current switching status. It may be understood that, when the switching status of the first optical switch 223 is changed to connect the first output end of the first waveband filter 222 to the input end of the first optical coupler 224, the filtering response of the first waveband filter 222 changes accordingly, causing a change of the filtering response formed by the adding module 220.

In this embodiment, the filtering response of the adding module 220 represents an optical frequency (or an optical wavelength) response characteristic of the adding module 220, and determines a waveband allowed to pass by the adding module 220. It may be learned that, a waveband that is allowed to pass by the adding module 220 may be controlled using the first optical switch 223. In addition, a transmission wavelength of the colorless optical transmitter 210 may automatically adapt to a waveband allowed to pass by the adding module 220 connected to the colorless optical transmitter 210. It may be learned that, the transmission wavelength of the colorless optical transmitter 210 may be adjusted by controlling the first optical switch, so as to dynamically control an add wavelength of the OADM node.

Optionally, in this embodiment, when a plurality of optical signals needs to be simultaneously added onto an optical transmission path, the colorless optical transmitter 210 may be an optical transmitter group including a plurality of colorless optical transmitters. In this case, a plurality of fan-out ports included in the first arrayed waveguide grating 221 may be in a one-to-one correspondence with the plurality of colorless optical transmitters, and each colorless optical transmitter in the optical transmitter group (i.e., the colorless optical transmitter 210) may transmit one optical signal. Alternatively, the colorless optical transmitter 210 may be an integrated optical transmitter that can transmit a plurality of optical signals in parallel, and in this case, a plurality of fan-out ports included in the first arrayed waveguide grating 221 may be in a one-to-one correspondence with the plurality of optical signals transmitted by the colorless optical transmitter 210.

Optionally, when the colorless optical transmitter 210 is an FP laser, an RSOA, a REAM, or a REAM-SOA, the adding module 220 may further include a second optical coupler 225 and an FRM (Faraday rotating mirror) or a partial light reflector 226. The first optical switch 223 is coupled to the input end of the first optical coupler 224 using the second optical coupler 225, and the first optical switch 223 is further coupled to the FRM 226 using the second optical coupler 225.

It may be understood that the adding unit 200 in this embodiment may be applied to optical transmission paths in a plurality of transmission modes. The following describes the OADM node separately in terms of an optical fiber optical transmission path in a single-fiber unidirectional mode and an optical fiber optical transmission path in a single-fiber bidirectional mode.

1. Single-Fiber Unidirectional Optical Transmission Path

In the case of a single-fiber unidirectional optical transmission path, the output end of the first optical coupler 224 of the adding unit 200 is coupled to an optical transmission direction of the optical transmission path, so that an optical signal that is output by the adding unit 200 is added onto the optical transmission direction of the optical transmission direction.

It may be understood that, if the OADM node needs to implement optical signal transmission in two directions, the optical transmission path needs to use two optical fibers, which include a first optical fiber used to transmit the optical signal in a first transmission direction and a second optical fiber used to transmit the optical signal in a second transmission direction. In this case, if the OADM node needs to add a wavelength channel in each of the foregoing two transmission directions, the OADM node includes two adding units 200. An output end of a first optical coupler 224 of one adding unit 200 is coupled in the first transmission direction of the first optical fiber, so that an optical signal that is output by the adding unit 200 is added onto the first transmission direction of the first optical fiber. An output end of a first optical coupler 224 of the other adding unit 200 is coupled in the second transmission direction of the second optical fiber, so that an optical signal that is output by the adding unit 200 is added onto the second transmission direction of the second optical fiber.

2. Single-Fiber Bidirectional Optical Transmission Path

In the case of a single-fiber bidirectional optical transmission path, the OADM node uses one optical fiber to transmit optical signals in two transmission directions. In this case, if the OADM node needs to add a wavelength channel in each of the foregoing two transmission directions, the OADM node includes two adding units 200. An output end of a first optical coupler 224 of one adding unit 200 is coupled in a first transmission direction of the optical fiber, so that an optical signal that is output by the adding unit 200 is added onto the first transmission direction of the optical fiber. An output end of a first optical coupler 224 of the other adding unit 200 is coupled in a second transmission direction of the optical fiber, so that an optical signal that is output by the adding unit 200 is added onto the second transmission direction of the optical fiber.

It may be learned that the adding unit 200 may be applied to optical transmission paths in a plurality of transmission modes. In an actual application process, the OADM node may configure a corresponding quantity of adding units 200 according to an actual requirement (for example, a requirement for adding a wavelength channel onto one or more optical fibers in a transmission direction of an optical fiber) of the OADM node, and implement a corresponding connection to an output end of the first optical coupler/the first optical combiner in the adding unit 200, so that the optical signal that is output by the adding unit 200 is added onto a corresponding transmission direction of a corresponding optical fiber.

Figure 6:
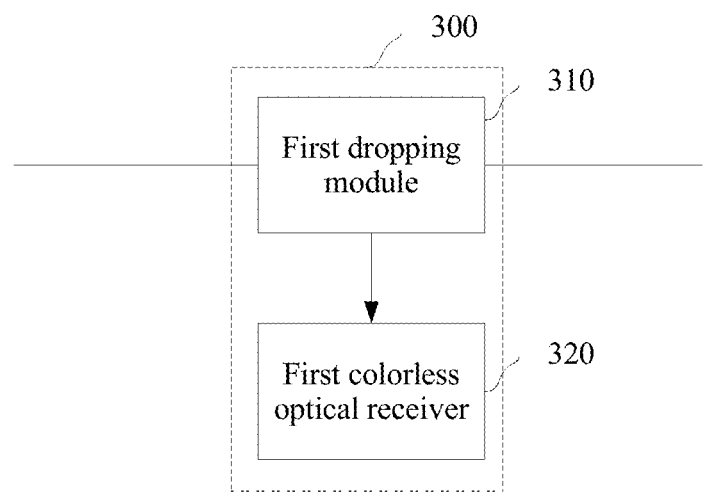
FIG. 6 is a schematic diagram of another embodiment of an OADM node in a WDM system according to an embodiment of the present invention.
Figure 7:
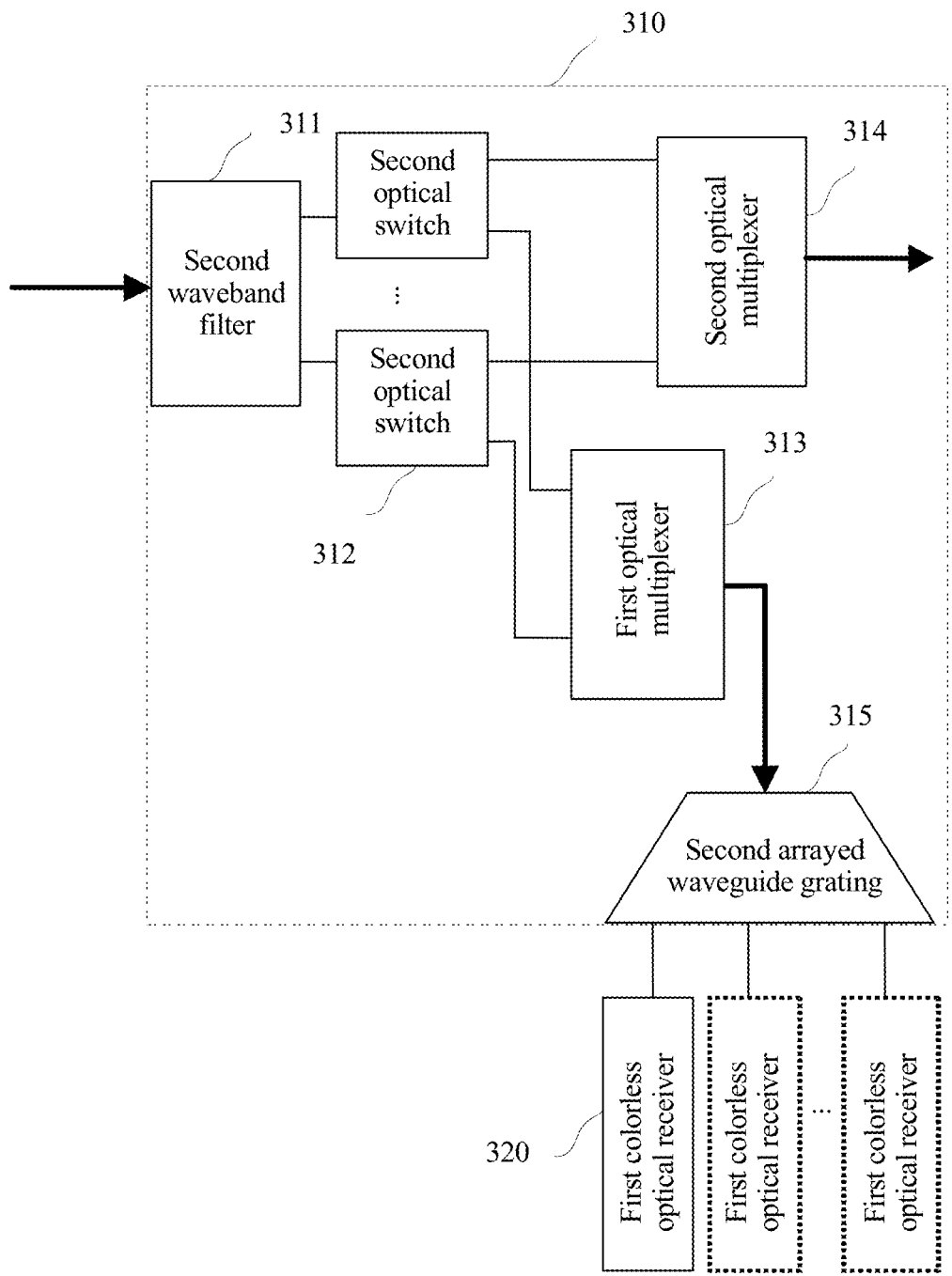
FIG. 7 is a schematic diagram of another embodiment of an OADM node in a WDM system according to an embodiment of the present invention.

Optionally, in this embodiment, the OADM node not only can dynamically control an add wavelength using the adding unit 200, but also can dynamically control a drop wavelength using a dropping unit, so as to implement any add/drop wavelength of the OADM node. Referring to FIG. 6 and FIG. 7, the following describes a structure of the dropping unit in the OADM node in detail.

In this embodiment, the OADM node may further include a first dropping unit 300, and the first dropping unit 300 includes a first dropping module 310 and a first colorless optical receiver 320.

A receiving wavelength of the first colorless optical receiver 320 may automatically adapt to a waveband allowed to pass by the first dropping module 310 connected to the first colorless optical receiver 320. That is, after the waveband allowed to pass by the first dropping module 310 is determined, the first colorless optical receiver 320 may adaptively receive an optical signal of the corresponding allowed waveband. In this embodiment, the first colorless optical receiver 320 may include a wideband optical detector and a related circuit. Specifically, a specific structure of the colorless optical receiver is not limited herein.

The first dropping module 310 includes: a second waveband filter 311 configured to divide an input optical signal into N sub-signals of different wavebands, N second optical switches 312, a first optical multiplexer 313, a second optical multiplexer 314, and a second arrayed waveguide grating 315, where N is an integer greater than 1. The N sub-signals of different wavebands are respectively output by N output ends of the second waveband filter 311.

The second waveband filter 311 is a 1:N waveband filter, and includes one input end and N output ends. In this embodiment, the input end of the second waveband filter 311 is coupled to the optical transmission path, and each output end of the second waveband filter 311 is separately coupled to an input end of the first optical multiplexer 313 and an input end of the second optical multiplexer 314 using one second optical switch 312. The N output ends of the second waveband filter 311 are in a one-to-one correspondence with N second optical switches 312, that is, each output end of the second waveband filter 311 is corresponding to one second optical switch 312.

The second optical switch 312 is configured to transmit a corresponding sub-signal to the input end of the first optical multiplexer 313 or the input end of the second optical multiplexer 314 according to a control signal. In this embodiment, a sub-signal corresponding to the second optical switch 312 is a sub-signal output by the output end that is coupled to the second optical switch 312 and that is of the second waveband filter 311. In this embodiment, the second optical switch 312 may be a 1:2 optical switch, and two output ends of the 1:2 optical switch are respectively coupled to the input end of the first optical multiplexer 313 and the input end of the second optical multiplexer 314, so as to determine, according to a second control signal, whether to transmit the corresponding sub-signal to the input end of the first optical multiplexer 313 or to the second optical multiplexer 314.

An output end of the first optical multiplexer 313 is coupled to a receive end of the first colorless optical receiver 320 using the second arrayed waveguide grating 315. In this embodiment, the first optical multiplexer 313 is configured to perform multiplexing processing on the input sub-signal. It may be understood that, the first optical multiplexer 313 may be an N:1 waveband filter or an N:1 optical combiner. For example, in an actual application process, three second optical switches 312 transmit corresponding sub-signals to the input end of the first optical multiplexer 313, and the input end of the first optical multiplexer 313 performs multiplexing processing on the three sub-signals.

The second arrayed waveguide grating 315 may be a 1:Y periodic arrayed waveguide grating, and the 1:Y periodic arrayed waveguide grating has one common port and Y fan-out ports, where Y is an integer greater than 1. In this embodiment, a fan-out port of the second arrayed waveguide grating 315 is coupled to a transmit end of the first colorless optical receiver 320. The common port of the second arrayed waveguide grating 315 is coupled to the output end of the first optical multiplexer 313.

An output end of the second optical multiplexer 314 is coupled to the optical transmission path. In this embodiment, the second optical multiplexer 314 is configured to perform multiplexing processing on the input sub-signal. It may be understood that, the second optical multiplexer 314 may be an N:1 waveband filter or an N:1 optical combiner.

It may be learned that, an optical signal transmitted on the optical transmission path is divided into N sub-signals of different wavebands after entering the second waveband filter 311, and the N sub-signals are output by the N output ends of the second waveband filter 311. In this case, whether each sub-signal is transmitted to the input end of the first optical multiplexer 313 or to the input end of the second optical multiplexer 314 may be determined by controlling switching statuses of the N second optical switches. After multiplexing processing is performed on a sub-signal transmitted to the first optical multiplexer 313, the sub-signal is transmitted to the first colorless optical receiver 320 using the second arrayed waveguide grating 315. In addition, after multiplexing processing is performed on a sub-signal transmitted to the second optical multiplexer 314, the sub-signal is transmitted to the optical transmission path.

It may be learned that, dropping sub-signals of wavebands may be determined by controlling the switching statuses of the N second optical switches, and an operating receiving wavelength of the first colorless optical receiver 320 may automatically adapt to a waveband allowed to pass by the first dropping module 310 connected to the first colorless optical receiver 320. It may be learned that, the drop wavelength of the OADM node may be dynamically controlled by controlling the second optical switch.

Optionally, in this embodiment, when a plurality of optical signals need to be simultaneously dropped from the optical transmission path, the first colorless optical receiver 320 may be an optical receiver group including a plurality of colorless optical receivers. In this case, a plurality of fan-out ports included in the second arrayed waveguide grating 315 may be in a one-to-one correspondence with the plurality of colorless optical receivers, and each colorless optical receiver in the optical receiver group (i.e., the first colorless optical receiver 320) may receive one optical signal. Alternatively, the first colorless optical receiver 320 may be an integrated optical receiver that can receive a plurality of optical signals in parallel, and in this case, a plurality of fan-out ports included in the second arrayed waveguide grating 315 may be in a one-to-one correspondence with the plurality of optical signals received by the first colorless optical receiver 320.

Figure 8:
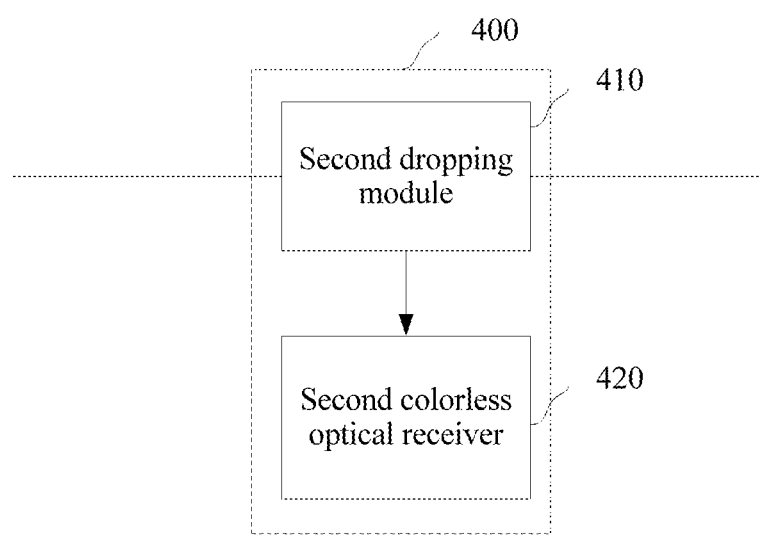
FIG. 8 is a schematic diagram of another embodiment of an OADM node in a WDM system according to an embodiment of the present invention.
Figure 9:
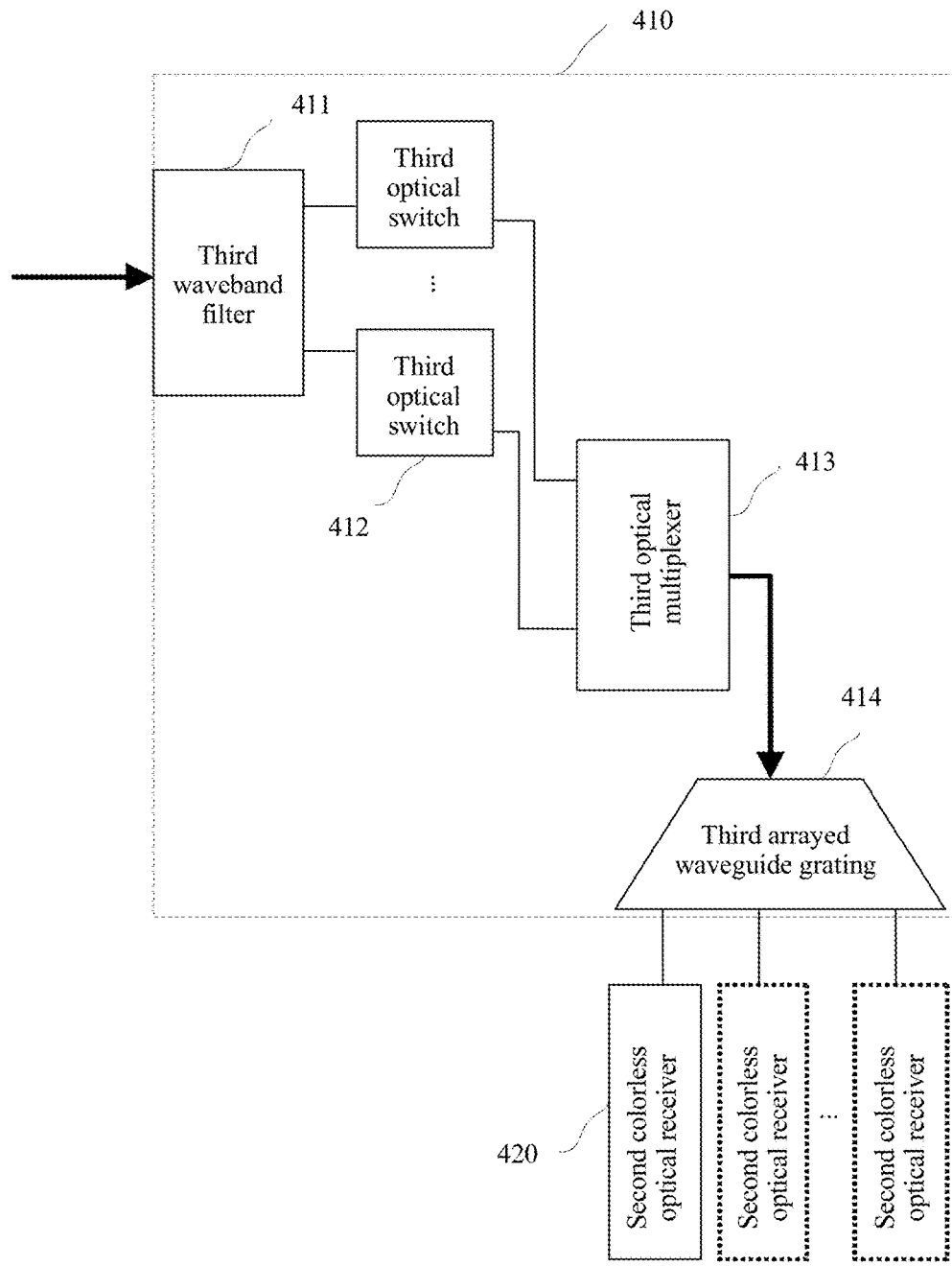
FIG. 9 is a schematic diagram of another embodiment of an OADM node in a WDM system according to an embodiment of the present invention.

Optionally, in some application scenarios, when the OADM node does not further need to transmit an optical signal to a next node, the dropping unit does not need to transmit some sub-signals to the optical transmission path any more. In this case, some optical components such as the second optical multiplexer 314 may be removed from the dropping unit based on the first dropping unit 300. For details, refer to FIG. 8 and FIG. 9. The following describes another structure of the dropping unit in detail.

In this embodiment, the OADM node may further include a second dropping unit 400, and the second dropping unit 400 includes a second dropping module 410 and a second colorless optical receiver 420.

The second dropping module 410 includes: a third waveband filter 411 configured to divide an input optical signal into K sub-signals of different wavebands, K third optical switches 412, a third optical multiplexer 413, and a third arrayed waveguide grating 414, where K is an integer greater than 1, and the K sub-signals of different wavebands are respectively output by K output ends of the third waveband filter 411.

An input end of the third waveband filter 411 is coupled to the optical transmission path, and each output end of the third waveband filter 411 is coupled to an input end of the third optical multiplexer 413 using one third optical switch 412.

The third optical switch 412 is configured to determine, according to a control signal, whether to transmit a corresponding sub-signal to the input end of the third optical multiplexer 413.

The third optical multiplexer 413 is configured to perform multiplexing processing on the input sub-signal, and an output end of the third optical multiplexer 413 is coupled to a receive end of the second colorless optical receiver 420 using the third arrayed waveguide grating 414.

It may be learned that, a difference between the second dropping unit 400 and the first dropping unit 300 is as follows. Because an optical signal reaching the OADM node does not need to be further transmitted, the second dropping unit 400 needs only one optical multiplexer (that is, another optical multiplexer for cooperating with the optical transmission path is removed) for cooperating with the colorless optical receiver. In this case, the optical switch only needs to determine, according to the control signal, whether to transmit the corresponding sub-signal to the optical multiplexer. It may be learned that, in this embodiment, the third optical switch 412 may be a 1:1 optical switch.

It may be understood that, the dropping unit 400 in this embodiment may also adapt to optical transmission paths in a plurality of transmission modes. In an actual application process, the OADM node may configure a corresponding quantity of adding units according to an actual requirement (for example, a requirement for dropping an optical signal from one or more optical fibers in a transmission direction of an optical fiber) of the OADM node, and implement a corresponding connection to an input end of the waveband filter in the adding unit, so as to drop an optical signal from a corresponding transmission direction of a corresponding optical fiber. For example, in the single-fiber bidirectional optical transmission path, if the OADM node needs to separately drop optical signals from two transmission directions in the optical fiber, the OADM node may include two dropping units. An input end of a waveband filter of one dropping unit is coupled to a first transmission direction of the optical fiber, so as to drop an optical signal from a first transmission direction of the optical fiber; and an input end of a waveband filter of the other dropping unit is coupled to a second transmission direction of the optical fiber, so as to drop an optical signal from the second transmission direction of the optical fiber.

The following provides examples of OADM node structures that are based on different transmission modes.

Figure 10:
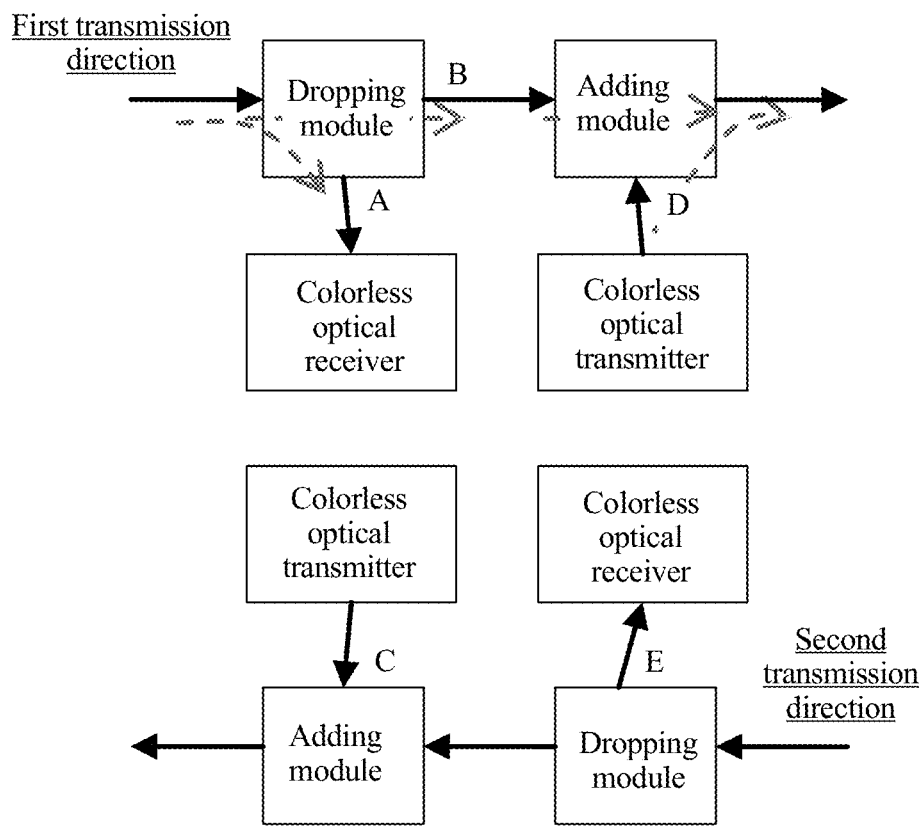
FIG. 10 is a schematic diagram of another embodiment of an OADM node in a WDM system according to an embodiment of the present invention.

For example, in FIG. 10, a first optical fiber in the OADM node is used to transmit an optical signal in a first transmission direction, and a second optical fiber is used to transmit an optical signal in a second transmission direction. For example, an OADM node 2 in FIG. 1 is used as an example. An optical signal in a first transmission direction of the OADM node 2 is transmitted by an OADM node 1, and then the optical signal is transmitted by the OADM node 2 to an OADM node 3. The optical signal in the first transmission direction is transmitted by a single-fiber unidirectional first optical fiber. An optical signal in a second transmission direction of the OADM node 2 is transmitted by the OADM node 3, and then the optical signal is transmitted by the OADM node 2 to the OADM node 1, and the optical signal in the second transmission direction is transmitted by a single-fiber unidirectional second optical fiber.

A dropping unit on the first optical fiber is configured to drop a sub-signal of a waveband from the optical signal in the first transmission direction, and an adding unit on the first optical fiber is configured to add a sub-signal of a waveband onto the optical signal in the first transmission direction. For a specific optical signal transmission direction, refer to a dashed-line part in FIG. 10.

A dropping unit on the second optical fiber is configured to drop a sub-signal of a waveband from the optical signal in the second transmission direction, and an adding unit on the first optical fiber is configured to add a sub-signal of a waveband onto the optical signal in the second transmission direction.

Optionally, a waveband of a sub-signal (e.g., corresponding to a port A) dropped from the first transmission direction is the same as a waveband of a sub-signal (e.g., corresponding to a port C) added onto the second transmission direction. For example, in the OADM node 2, a sub-signal dropped from the first transmission direction is corresponding to an optical signal transmitted by the OADM node 1, and a sub-signal added onto the second transmission direction is corresponding to an optical signal transmitted to the OADM node 1.

Optionally, a waveband of a sub-signal (e.g., corresponding to a port E) dropped from the second transmission direction is the same as a waveband of a sub-signal (e.g., corresponding to a port D) added onto the first transmission direction. For example, in the OADM node 2, a sub-signal dropped from the second transmission direction is corresponding to an optical signal transmitted by the OADM node 3, and a sub-signal added onto the first transmission direction is corresponding to an optical signal transmitted to the OADM node 3.

Figure 11:
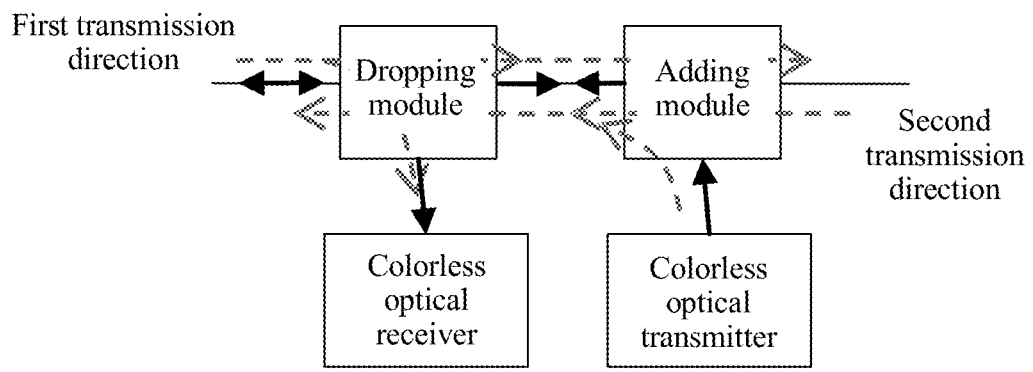
FIG. 11 is a schematic diagram of another embodiment of an OADM node in a WDM system according to an embodiment of the present invention.

For example, in FIG. 11, one optical fiber in an OADM node is used to transmit optical signals in two transmission directions (that is, an optical signal is transmitted in a first transmission direction and an optical signal is transmitted in a second transmission direction). For example, the OADM node 2 in FIG. 1 is used as an example. An optical signal in the first transmission direction of the OADM node 2 is transmitted by the OADM node 1, and then the optical signal is transmitted by the OADM node 2 to the OADM node 3. An optical signal in the second transmission direction of the OADM node 2 is transmitted by the OADM node 3, and then the optical signal is transmitted by the OADM node 2 to the OADM node 1.

A dropping unit on an optical fiber is configured to drop a sub-signal of a waveband from an optical signal in the first transmission direction, and an adding unit is configured to add a sub-signal of a waveband onto an optical signal in the second transmission direction. In this case, optionally, the waveband of the sub-signal dropped from the first transmission direction is the same as the waveband of the sub-signal added onto the second transmission direction.

Optionally, a dropping unit may be further added onto the optical fiber, and is configured to drop a sub-signal of a waveband from the optical signal in the second transmission direction. Alternatively, an adding unit is further added, and is configured to add a sub-signal of a waveband onto the optical signal in the first transmission direction. In this case, optionally, the waveband of the sub-signal dropped from the second transmission direction is the same as the waveband of the sub-signal added onto the first transmission direction.

Figure 12:
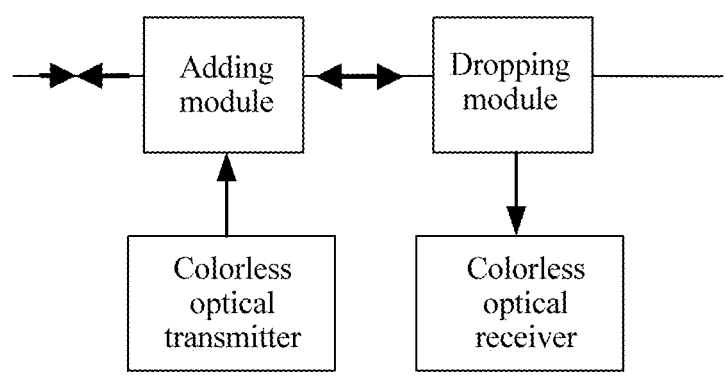
FIG. 12 is a schematic diagram of another embodiment of an OADM node in a WDM system according to an embodiment of the present invention.

It may be understood that, in this embodiment, a sequence of configuring the adding unit and the dropping unit is not limited. As shown in FIG. 12, the adding unit may be first configured, and the dropping unit is then configured.

The following describes how each OADM node dynamically controls an add wavelength of the OADM node using the adding unit. An embodiment of an optical add/drop multiplexing method in a WDM system in this embodiment includes: receiving a control signal sent by the WDM system; setting a switching status of the first optical switch according to the control signal, so as to connect a target output end to the input end of the first optical coupler/the first optical combiner, where the target output end is one of the M output ends of the first waveband filter; determining a filtering response of the adding unit in a current switching status; and determining a transmission wavelength of the colorless optical transmitter according to the filtering response.

That is, in an actual application process, an administrator enters a control instruction into an optical network management plane, an optical network control plane or an optical network controller in the WDM system, and a corresponding control signal is generated. Different control instructions are corresponding to different control signals (electrical signals). It may be learned that, the control signal generally may include a plurality of electrical signals that are used to instruct to connect the input end of the first optical coupler/the first optical combiner to a preset target output end. Different target output ends are corresponding to different electrical signals. For example, when a first electrical signal is received, the input end of the first optical coupler/the first optical combiner is connected to a first output end of the first waveband filter. In another example, when a second electrical signal is received, the input end of the first optical coupler/the first optical combiner is connected to a second output end of the first waveband filter. The first optical switch in the adding unit sets a switching status of the first optical switch according to the control signal, so as to connect the target output end to the input end of the first optical coupler/the first optical combiner. The target output end is one of the M output ends of the first waveband filter. In this case, the colorless optical transmitter may obtain, using a feedback mechanism, a filtering response of the adding module (or, regarded as the adding unit) connected to the colorless optical transmitter in a current switching status, then determine, according to the filtering response, a waveband allowed to pass by the adding module in the current switching status, and automatically adapt to the waveband, so as to adjust the transmission wavelength of the colorless optical transmitter and dynamically control the add wavelength of the OADM node.

The following describes how each OADM node dynamically controls a drop wavelength of the OADM node using the dropping unit.

For the first dropping unit, an optical add/drop multiplexing method in the WDM system in this embodiment may further include: receiving a control signal sent by the WDM system; setting a switching status of each second optical switch according to the control signal, so as to determine whether to transmit a corresponding sub-signal to an input end of a first optical multiplexer or to an input end of a second optical multiplexer; performing multiplexing processing on a sub-signal that is input into the first optical multiplexer, and determining a receiving wavelength of the first colorless optical receiver according to an optical signal on which multiplexing processing is performed by the first optical multiplexer; and performing multiplexing processing on a sub-signal that is input into the second optical multiplexer, and coupling, to the optical transmission path, an optical signal on which multiplexing processing is performed by the second optical multiplexer.

That is, in an actual application process, the administrator enters a control instruction into the optical network management plane, the optical network control plane, or the optical network controller in the WDM system, and a corresponding control signal is generated. The second optical switch in the first dropping unit sets a switching status of each second optical switch according to the control signal, so as to determine whether to transmit the corresponding sub-signal to the input end of the first optical multiplexer or to the input end of the second optical multiplexer. The first optical multiplexer of the first dropping unit performs multiplexing processing on the input sub-signal, and in this case, the first colorless optical receiver may determine a receiving wavelength of the first colorless optical receiver according to an optical signal on which multiplexing processing is performed by the first optical multiplexer. In addition, the second optical multiplexer performs multiplexing processing on the input sub-signal, and couples, to the optical transmission path, the optical signal on which multiplexing processing is performed by the second optical multiplexer.

For a second dropping unit, an optical add/drop multiplexing method in the WDM system in this embodiment may further include: receiving a control signal sent by the WDM system; setting a switching status of each third optical switch according to the control signal, so as to determine whether to transmit a corresponding sub-signal to an input end of a third optical multiplexer; performing multiplexing processing on the sub-signal that is input into the third optical multiplexer; and determining a receiving wavelength of the second colorless optical receiver according to an optical signal on which multiplexing processing is performed.

That is, in an actual application process, the administrator enters a control instruction into the optical network management plane, the optical network control plane, or the optical network controller in the WDM system, and a corresponding control signal is generated. The third optical switch in the second dropping unit sets a switching status of each third optical switch according to the control signal, so as to determine whether to transmit the corresponding sub-signal to the input end of the third optical multiplexer. The third optical multiplexer performs multiplexing processing on the input sub-signal. In this case, the second colorless optical receiver may determine the receiving wavelength of the second colorless optical receiver according to an optical signal on which multiplexing processing is performed by the third optical multiplexer.

It may be understood that, in this solution, each OADM node may use a same hardware structure, and each OADM node may be enabled to operate at a different wavelength using only a control instruction to change the switching status of the optical switch, so as to improve flexibility of the WDM system and simplify deployment, installation, and maintenance of the WDM system with relatively low costs. This solution is suitable for a metropolitan area access optical network and a metropolitan area aggregation optical network. These networks are sensitive to the costs and strongly require a flexibly adaptive optical layer.

The following describes an OADM node applied to a point-to-point WDM system.

Figure 13:
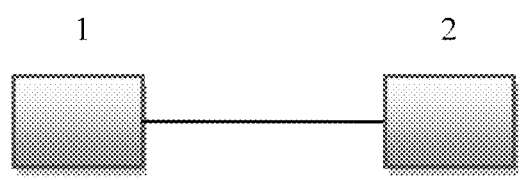
FIG. 13 is another schematic structural diagram of a WDM system according to an embodiment of the present invention.

As shown in FIG. 13, the WDM system includes an OADM node 1 and an OADM node 2. The OADM node 1 and the OADM node 2 are connected using one optical fiber, and the optical fiber is used to transmit optical signals in two transmission directions (that is, an optical signal is transmitted in a first transmission direction and an optical signal is transmitted in a second transmission direction). Here, the optical signal in the first transmission direction is an optical signal transmitted from the OADM node 1 to the OADM node 2, and the optical signal in the second transmission direction is an optical signal transmitted from the OADM node 2 to the OADM node 1.

Figure 14:
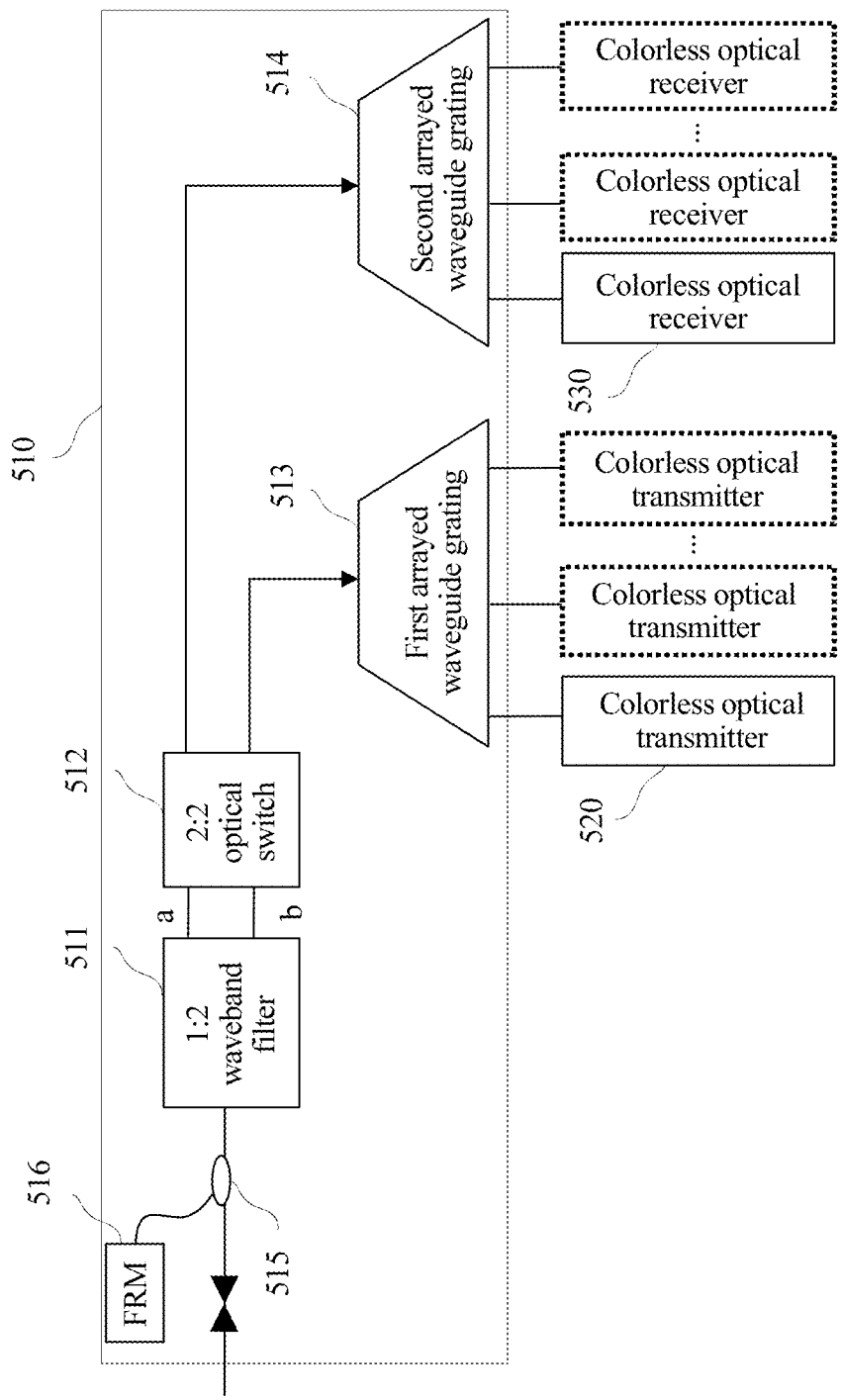
FIG. 14 is a schematic diagram of another embodiment of an OADM node in a WDM system according to an embodiment of the present invention.

Referring to FIG. 14, in this embodiment, the OADM node includes an adding/dropping module 510, a colorless optical transmitter 520, and a colorless optical receiver 530.

A transmission wavelength of the colorless optical transmitter 520 may automatically adapt to a transmission waveband allowed to pass by the adding/dropping module 510 connected to the colorless optical transmitter 520. That is, after the transmission waveband allowed to pass by the adding/dropping module 510 is determined, the colorless optical transmitter 520 may adaptively adjust the transmission wavelength to the corresponding allowed transmission waveband, so as to adapt to an optical wavelength response characteristic of the adding/dropping module 510.

A receiving wavelength of the colorless optical receiver 530 may automatically adapt to a receiving waveband allowed to pass by the adding/dropping module 510 connected to the colorless optical receiver 530. That is, after the receiving waveband allowed to pass by the adding/dropping module 510 is determined, the colorless optical transmitter 520 may adaptively receive an optical signal of the corresponding allowed receiving waveband.

Figure 15:
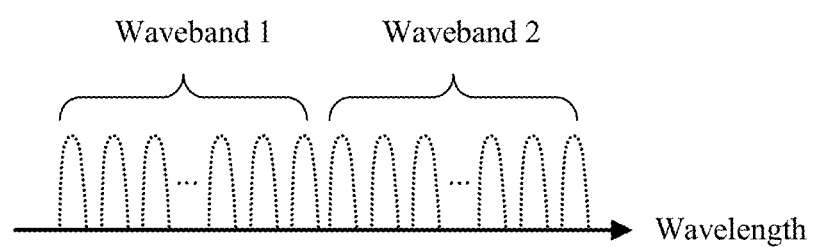
FIG. 15 is a schematic diagram of another type of waveband division for an optical signal.

A 1:2 waveband filter 511 includes one common port and two fan-out ports. In this embodiment, the common port of the 1:2 waveband filter 511 is coupled to an optical transmission path, the two fan-out ports of the 1:2 waveband filter 511 are respectively coupled to two first tributary ports of a 2:2 optical switch 512, and the two fan-out ports of the 1:2 waveband filter 511 are in a one-to-one correspondence with the two first tributary ports of the 2:2 optical switch 512. For example, in this embodiment, as shown in FIG. 15, a port a of the 1:2 waveband filter 511 is configured to transmit an optical signal of a waveband 1, and a port b of the 1:2 waveband filter 511 is configured to transmit an optical signal of a waveband 2.

The 2:2 optical switch 512 has the first tributary ports and two second tributary ports on the two sides, and the two second tributary ports of the 2:2 optical switch 512 are respectively coupled to a first arrayed waveguide grating 513 and a second arrayed waveguide grating 514. The switching status of the 2:2 optical switch 512 includes a bar state and a cross state. Specifically, here, a specific structure and a corresponding function of the 2:2 optical switch may be learned from the prior art. Details are not described herein. In this embodiment, the 2:2 optical switch 512 is configured to switch between a parallel-connected state and a cross-connected state according to a control signal.

The first arrayed waveguide grating 513 may be a 1:Z periodic arrayed waveguide grating, and the 1:Z periodic arrayed waveguide grating has one common port and Z fan-out ports, where Z is an integer greater than 1. In this embodiment, the common port of the first arrayed waveguide grating 513 is coupled to one second tributary port (for example, the port a in FIG. 14) of the 2:2 optical switch 512. A fan-out port of the first arrayed waveguide grating 513 is coupled to a transmit end of the colorless optical transmitter 520.

The second arrayed waveguide grating 514 may be a 1:W periodic arrayed waveguide grating, and the 1:W periodic arrayed waveguide grating has one common port and W fan-out ports, where W is an integer greater than 1. In this embodiment, the common port of the second arrayed waveguide grating 514 is coupled to the other second tributary port (for example, the port b in FIG. 14) of the 2:2 optical switch 512. A fan-out port of the second arrayed waveguide grating 514 is coupled to a receive end of the colorless optical receiver 530.

It may be learned that, whether the common port of the first arrayed waveguide grating 513 is coupled to the second tributary port of the 2:2 optical switch 512 may be determined by controlling the switching status of the 2:2 optical switch. When the common port of the first arrayed waveguide grating 513 is coupled to different second tributary ports of the 2:2 optical switch 512, the adding/dropping module 510 may form different filtering responses. In this way, the adding/dropping module 510 may form different filtering responses by controlling the switching status of the 2:2 optical switch. In addition, the filtering response determines the transmission waveband allowed to pass by the adding/dropping module, and the transmission wavelength of the colorless optical transmitter may automatically adapt to a transmission waveband allowed to pass by an adding unit. Therefore, the adding/dropping module may adjust the transmission wavelength of the colorless optical transmitter by controlling the switching status of the 2:2 optical switch, so as to dynamically control an add wavelength of the OADM node.

In addition, when the common port of the first arrayed waveguide grating 513 is coupled to different second tributary ports of the 2:2 optical switch 512, the adding/dropping module 510 may transmit sub-signals of different wavebands to the common port of the second arrayed waveguide grating 514. It may be learned that, the 2:2 optical switch may also determine to drop a sub-signal of a waveband by controlling the switching status of the 2:2 optical switch. An operating receiving wavelength of the first colorless optical receiver may automatically adapt to a receiving waveband allowed to pass by the adding/dropping module connected to the first colorless optical receiver. It may be learned that, a drop wavelength of the OADM node may be dynamically controlled by controlling the 2:2 optical switch.

It may be learned that, in this embodiment, whether two OADM nodes drop a waveband 1 and add a waveband 2 or two OADM nodes drop a waveband 2 and add a waveband 1 may be determined by controlling the switching status of the 2:2 optical switch 512. For example, in FIG. 14, the port a of the 1:2 waveband filter 511 is corresponding to the waveband 1 and the port b of the 1:2 waveband filter 511 is corresponding to the waveband 2. When the switching status of the 2:2 optical switch of the OADM node is the bar state, the OADM node drops the waveband 1 and adds the waveband 2. When the switching status of the 2:2 optical switch of the OADM node is the cross state, the OADM node drops the waveband 2 and adds the waveband 1.

For example, at an OADM node 1, the switching status of the 2:2 optical switch is the bar state, and the OADM node 1 drops the waveband 1 and adds the waveband 2. At an OADM node 2, the switching status of the 2:2 optical switch is the cross state, and the OADM node 2 drops the waveband 2 and adds the waveband 1. That is, in the WDM system, the waveband 1 is used for transmitting an optical signal by the OADM node 2 to the OADM node 1, and the waveband 2 is used for transmitting an optical signal by the OADM node 1 to the OADM node 2.

Similarly, optionally, in this embodiment, when a plurality of optical signals need to be simultaneously added onto the optical transmission path, the colorless optical transmitter 520 may be an optical transmitter group including a plurality of colorless optical transmitters, or the colorless optical transmitter 520 may be an integrated optical transmitter that can transmit a plurality of optical signals in parallel. Optionally, in this embodiment, when a plurality of optical signals need to be simultaneously dropped from the optical transmission path, the colorless optical receiver 530 may be an optical receiver group including a plurality of colorless optical receivers, or the colorless optical receiver 530 may be an integrated optical receiver that can receive a plurality of optical signals in parallel.

Similarly, optionally, in this embodiment, when the colorless optical transmitter 530 is an FP laser, an RSOA, a REAM, or a REAM-SOA, the adding/dropping module 510 may further include an optical coupler 515 and an FRM (Freddy rotating mirror, or partial light reflector) 516. A common port of the 1:2 waveband filter 511 is coupled to the optical transmission path using the optical coupler 515, and the common port of the 1:2 waveband filter 511 is further coupled to the FRM 516 using the optical coupler 515.

The following describes how each OADM node dynamically controls an add/drop wavelength of the OADM node in the point-to-point WDM system.

An administrator enters a control instruction into an optical network management plane, an optical network control plane or an optical network controller in the WDM system, and a corresponding control signal is generated. The 2:2 optical switch in the adding/dropping module sets the switching status of the 2:2 optical switch according to the control signal, so as to set the switching status of the 2:2 optical switch to the bar state or the cross state. In this case, the transmission waveband allowed to pass by the colorless optical transmitter and the receiving waveband allowed to pass by the colorless optical receiver may be determined. It may be learned that, the transmission wavelength of the colorless optical transmitter and the receiving wavelength of the colorless optical receiver may be determined.

It may be clearly understood by persons skilled in the art that, for ease and brevity of description, for a specific working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of embodiments of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A node in a wavelength division multiplexing (WDM) system, comprising:
   a colorless optical transmitter configured to provide optical signals of a plurality of wavelengths at the node that are addable by the node onto an optical transmission path for transmission; and
   an adding unit configured to add a configurable wavelength channel according to a first control signal onto the optical transmission path, by adding one of the optical signals from the colorless optical transmitter onto the optical transmission path, the adding unit comprising:
   a first arrayed waveguide grating configured to pass the optical signals from the colorless optical transmitter to a first waveband filter;
   the first waveband filter configured to divide the optical signals into M sub-signals of different wavebands, wherein M is an integer greater than 1, and the M sub-signals of different wavebands are respectively output by M output ends of the first waveband filter;
   a first M:1 optical switch comprising M input ends and a single output end, the M input ends of the first M:1 optical switch coupled with the M output ends of the first waveband filter, respectively; and
   a first optical coupler/a first optical combiner having a first input end coupled to the single output end of the first M:1 optical switch and having a second output end coupled to the optical transmission path; and
   wherein a transmit end of the colorless optical transmitter is coupled to an input end of the first waveband filter via the first arrayed waveguide grating; and
   wherein the first M:1 optical switch is configured to pass, from the first waveband filter to the first optical coupler/the first optical combiner, a first optical signal of a first wavelength in the optical signals to add the first optical signal onto the optical transmission path by connecting an output end in the M output ends of the first waveband filter corresponding to the first wavelength of the first optical signal to the input end of the first optical coupler/the first optical combiner according to the first control signal.

2. The node in the WDM system according to claim 1, wherein the node further comprises a first dropping unit, the first dropping unit comprising:
   a second waveband filter configured to divide an input optical signal of the second waveband filter into N sub-signals of different wavebands, wherein N is an integer greater than 1, and the N sub-signals of different wavebands are respectively output by N output ends of the second waveband filter;
   N second optical switches coupled to the second waveband filter;
   a first optical multiplexer coupled to the N second optical switches;
   a second optical multiplexer coupled to the N second optical switches;
   a second arrayed waveguide grating; and
   a first colorless optical receiver; and
   wherein an input end of the second waveband filter is coupled to the optical transmission path, and each of the N second optical switches is configured to connect an output end in the N output ends of the second waveband filter to an input end of the first optical multiplexer or an input end of the second optical multiplexer according to a second control signal, such that a sub-signal output by the second waveband filter is transmitted to the first optical multiplexer or the second optical multiplexer through a corresponding second optical switch;
   wherein the first optical multiplexer is configured to perform multiplexing processing on an input signal of the first optical multiplexer, and an output end of the first optical multiplexer is coupled to a receive end of the first colorless optical receiver via the second arrayed waveguide grating; and wherein the second optical multiplexer is configured to perform multiplexing processing on an input signal of the second optical multiplexer, and an output end of the second optical multiplexer is coupled to the optical transmission path.

3. The node in the WDM system according to claim 1, wherein the node further comprises a second dropping unit, the second dropping unit comprising:

a third waveband filter configured to divide an input optical signal of the third waveband filter into K sub-signals of different wavebands, wherein K is an integer greater than 1, and the K sub-signals of different wavebands are respectively output by K output ends of the third waveband filter;

K third optical switches coupled to the K output ends of the third waveband filter;

a third optical multiplexer;

a third arrayed waveguide grating; and a second colorless optical receiver;

wherein an input end of the third waveband filter is coupled to the optical transmission path, and each of the K third optical switches is configured to determine, according to a third control signal, whether to connect an output end in the K output ends of the third waveband filter to an input end of the third optical multiplexer so that a sub-signal output by the output end is passed to the third optical multiplexer; and wherein the third optical multiplexer is configured to perform multiplexing processing on an input signal of the third optical multiplexer, and an output end of the third optical multiplexer is coupled to a receive end of the second colorless optical receiver via the third arrayed waveguide grating.

4. The node in the WDM system according to claim 1, wherein the adding unit further comprises a second optical coupler and a partial light reflector, the first optical switch is coupled to the input end of the first optical coupler/the first optical combiner via the second optical coupler, and the first optical switch is further coupled to the partial light reflector via the second optical coupler.

5. The node in the WDM system according to claim 1, wherein the first control signal comprises a plurality of electrical signals, each of the plurality of electrical signals instructs to connect the input end of the first optical coupler/the first optical combiner to a preset output end in the M output ends of the first waveband filter, and the plurality of electrical signals are sent by an optical network management plane, an optical network control plane, or an optical network controller in the WDM system.

6. The node in the WDM system according to claim 1, wherein the node is an optical add/drop multiplexing (OADM) node in the WDM system.

7. The node in the WDM system according to claim 1, wherein the colorless optical transmitter comprises a tunable laser, a Fabry-Perot (FP) laser, a reflective semiconductor optical amplifier (RSOA), a reflective electro-absorption modulator (REAM), or a REAM integrated with a semiconductor optical amplifier (REAM-SOA).

8. The node in the WDM system according to claim 1, wherein the adding unit forms filtering response when the input end of the first optical coupler/the first optical combiner is connected to the output end in the M output ends of the first waveband filter corresponding to the first wavelength of the first optical signal, and the filtering response determines a waveband allowed to pass by the adding unit.

9. The node in the WDM system according to claim 2, wherein the optical transmission path is a single-fiber bidirectional optical transmission path, and the node comprises two adding units, wherein a first adding unit in the two adding units is configured to add a first output optical signal of the node onto a first transmission direction of the optical transmission path, and a second adding unit in the two adding units is configured to add a second output optical signal onto a second transmission direction of the optical transmission path.

10. The node in the WDM system according to claim 9, wherein the node comprises two first dropping units, a first dropping unit in the two first dropping units is configured to drop a second optical signal transmitted in the first transmission direction of the optical transmission path, and a second dropping unit in the two first dropping units is configured to drop a second optical signal transmitted in the second transmission direction of the optical transmission path.

11. A method comprising:

receiving, by a node in a wavelength division multiplexing (WDM) system, a first control signal sent by the WDM system, wherein the node comprises an adding unit, the adding unit configured to add a configurable wavelength channel according to the first control signal onto an optical transmission path, and comprising a first waveband filter, a first arrayed waveguide grating, a first M:1 optical switch having M input ends and a single output end, and a first optical coupler/a first optical combiner coupled to the optical transmission path, wherein the first waveband filter is configured to divide an input optical signal of the first waveband filter into M sub-signals of different wavebands and output the M sub-signals of different wavebands to the first M:1 optical switch using M output ends, wherein M is an integer greater than 1, and wherein the M input ends of the first M:1 optical switch are coupled with the M output ends of the first waveband filter, respectively;

providing, at the node through a colorless optical transmitter of the node, optical signals of a plurality of wavelengths that are addable by the adding unit onto the optical transmission path, the colorless optical transmitter coupled to the first waveband filter via the first arrayed waveguide grating;

setting, by the node, a first switching status of the first M:1 optical switch according to the first control signal, to pass, from the first waveband filter to the first optical coupler/the first optical combiner, a first optical signal of a first wavelength in the optical signals to add the first optical signal onto the optical transmission path, the first switching status is set such that an output end in the M output ends of the first waveband filter corresponding to the first wavelength of the first optical signal is connected to an input end of the first optical coupler/the first optical combiner through the first M:1 optical switch;

determining, by the node, a filtering response of the adding unit when the first optical switch is in the first switching status that is set; and adjusting, by the node, a transmission wavelength of the colorless optical transmitter according to the filtering response.

12. The method according to claim 11, further comprising:

receiving, by the node, a second control signal sent by the WDM system, wherein the node further comprises a first dropping unit, the first dropping unit comprising:

N second optical switches coupled to a second waveband filter, a first optical multiplexer and a second optical multiplexer, respectively, and a first colorless optical receiver coupled to the first optical multiplexer via a second arrayed waveguide grating, wherein the second waveband filter is configured to divide an input optical signal of the second waveband filter into N sub-signals of different wavebands and output the N sub-signals of different wavebands to the N second optical switches respectively using N output ends, and N is an integer greater than 1, and wherein an input end of the second waveband filter and an output end of the second optical multiplexer are coupled to the optical transmission path;

setting, by the node, a switching status of each second optical switch according to the second control signal, and determining, by the node, whether a sub-signal output by an output end of the second waveband filter is transmitted to the first optical multiplexer or to the second optical multiplexer through a corresponding second optical switch based on the switching status of the corresponding second optical switch;

performing, by the node, multiplexing processing on a second optical signal that is input into the first optical multiplexer, and determining, by the node, a receiving wavelength of the first colorless optical receiver according to the first optical signal; and performing, by the node, multiplexing processing on a second optical signal that is input into the second optical multiplexer, and coupling, by the node, the second optical signal to the optical transmission path.

13. The method according to claim 11, further comprising:

receiving, by the node, a third control signal sent by the WDM system, wherein the node further comprises a second dropping unit, the second dropping unit comprising K third optical switches coupled to a third optical multiplexer, a second colorless optical receiver coupled to the third optical multiplexer via a third arrayed waveguide grating, and a third waveband filter coupled to the optical transmission path, wherein the third waveband filter is configured to divide an input optical signal of the third waveband filter into K sub-signals of different wavebands and output the K sub-signals of different wavebands to the K third optical switches, respectively;

setting, by the node, a switching status of each of the K third optical switches according to the third control signal, and determining, by the node, whether or not a sub-signal output by the third waveband filter is transmitted to the third optical multiplexer through a corresponding third optical switch based on the switching status of the corresponding third optical switch;

performing, by the node, multiplexing processing on an optical signal that is input into the third optical multiplexer; and determining, by the node, a receiving wavelength of the second colorless optical receiver according to the optical signal.

14. The method according to claim 11, wherein the node is an optical add/drop multiplexing (OADM) node in the WDM system.

15. The method according to claim 11, wherein the colorless optical transmitter comprises a tunable laser, a Fabry-Perot (FP) laser, a reflective semiconductor optical amplifier (RSOA), a reflective electro-absorption modulator (REAM), or a REAM integrated with a semiconductor optical amplifier (REAM-SOA).

* * * * *